United States Patent Office 3,427,999
Patented Feb. 18, 1969

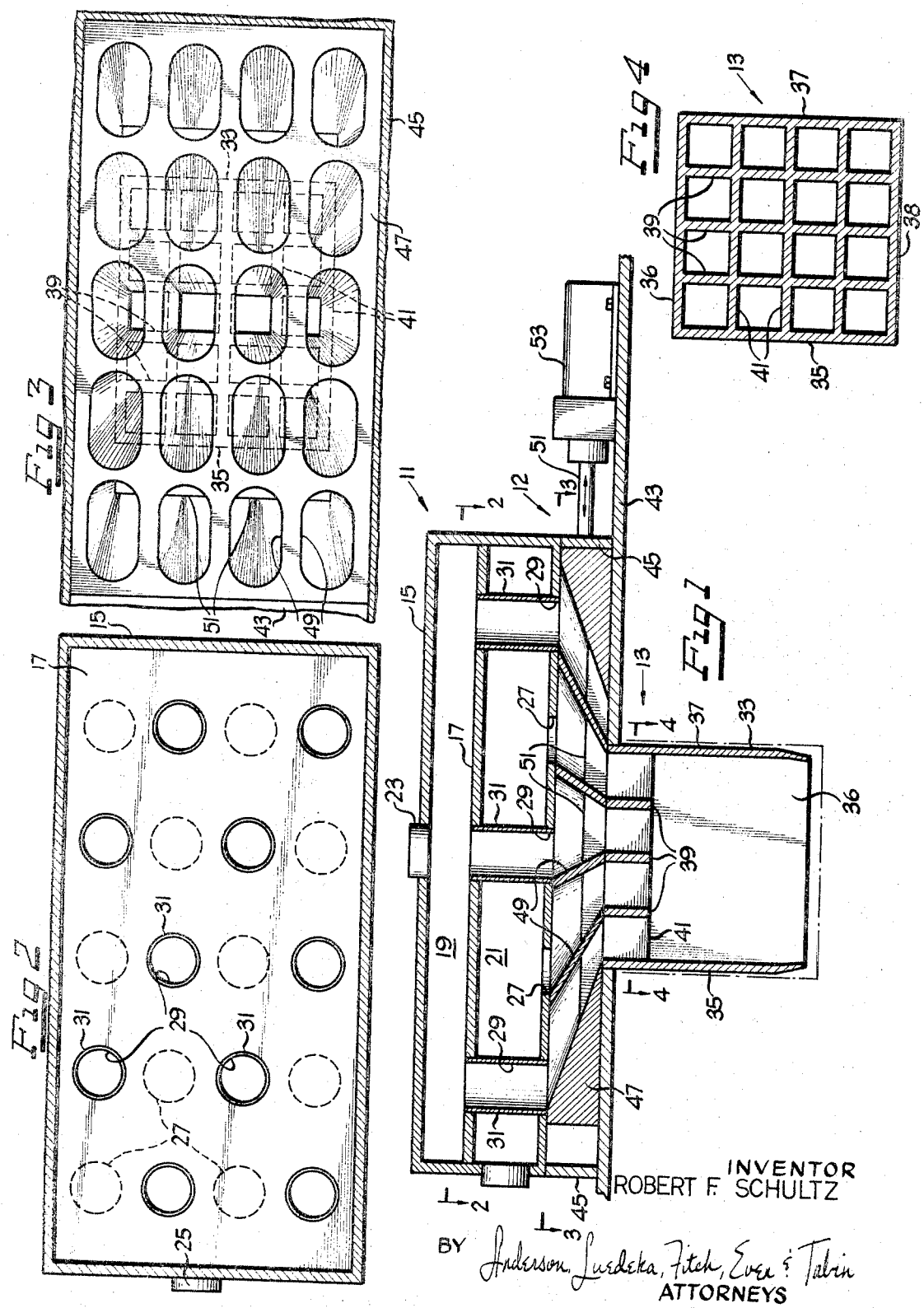

3,427,999
APPARATUS FOR FORMING AN EDIBLE PRODUCT
Robert F. Schultz, Mount Prospect, Ill., assignor to National Dairy Products Corporation, New York, N.Y., a corporation of Delaware
Filed Sept. 1, 1965, Ser. No. 484,221
U.S. Cl. 107—1
Int. Cl. A23g 3/00, 5/00
4 Claims

ABSTRACT OF THE DISCLOSURE

Apparatus for forming an edible product of different materials with similar sections of the materials arranged in contacting layers and with the sections in each layer arranged in parallel contacting rows, each section in each row in each layer contacting at least one section of a different material in the same row, at least one section of different material in at least one adjacent row, and at least one section of different material in at least one adjacent layer. The different materials are extruded through different orifices of a header with a valve controlling the flow of the materials into one or more forming nozzles.

---

This invention relates to the forming of an edible product comprised of a plurality of adjacent columns, each including a plurality of plastic materials in sequentially arranged sections. More particularly, the invention relates to apparatus for forming an edible product into a rectangular main block comprised of a plurality of substantially smaller adjacent rectangular blocks of a substantially lesser plurality of different plastic materials arranged sequentially in each of the three directions parallel to the respective edges of the main block.

The invention has particular application to the manufacture of ice cream products having patterns of contrasting colors and/or flavors in three dimensions. In copending application Ser. No. 337,991, filed Jan. 13, 1964 now Patent No. 3,295,466 and assigned to the assignee of the present invention, such a product and the apparatus for making the product are shown and described. The product described therein is a main block of ice cream comprised of a plurality of smaller blocks of two different flavors arranged such that when the block is sliced in a plane parallel to any of its sides, the resulting surfaces at the slice each have a checkboard pattern. The application describes a header, a source for both flavors of ice cream, which extrudes the ice cream through a plurality of orifices arranged in a checkerboard pattern. The header reciprocates with respect to a plurality of forming nozzles feeding the ice cream into a package in order to produce a main block having an alternating pattern of smaller blocks in all three dimensions.

Such apparatus has found considerable success in actual commercial use. Nevertheless, under some circumstances it may be desirable to avoid the necessity for reciprocating the entire header in order to achieve the desired pattern in the final product. For example, cost or size limitations may be such as to preclude the utilization of apparatus wherein the entire header is reciprocated.

Accordingly, it is an object of this invention to provide apparatus for forming an edible product of the type described and in which the header may remain fixed with respect to the forming nozzles.

Another object of the invention is to provide an alternative to the ice cream forming machine disclosed in patent application Ser. No. 337,991.

Still another object is to provide apparatus, for forming an edible product of the type described, which is relatively simple in construction and operation.

Other objects and various advantages of the invention will become apparent to those skilled in the art from the following description taken in connection with the accompanying drawing wherein:

FIGURE 1 is a side elevational view in full section of apparatus constructed in accordance with the invention;
FIGURE 2 is a sectional view taken along the line 2—2 of FIGURE 1;
FIGURE 3 is a sectional view taken along the line 3—3 of FIGURE 1; and
FIGURE 4 is a sectional view taken along the line 4—4 of FIGURE 1.

The invention provides apparatus for forming an edible product into a column comprised of a plurality of plastic materials in sequential sections. The apparatus may be so constructed as to form a plurality of such columns adjacent each other to form a rectangular main block comprised of the plurality of smaller rectangular blocks arranged sequentially in each of the three directions parallel to the respective edges of the main block. The apparatus includes a header having a plurality of orifices therein. Each of the materials is extruded through a respective one of the orifices in the header. A forming nozzle is provided for shaping the materials into a column, and a plurality of such nozzles may be grouped together to form a desired size of rectangular main block. A valve is positioned intermediate the header and the forming nozzle for controlling the flow of the materials from the header to the forming nozzle. The valve comprises a valve element movable to a plurality of positions in a plane transverse to the flow of materials from the header to the nozzles. The valve element has a plurality of passages therein corresponding in number to the plurality of positions to which the valve element is movable. Each of the passages communicates at one end thereof with a respective one of the plurality of orifices in the header in all of the respective positions of the valve element. The various passages in the valve element are formed to alternately communicate with the nozzle at the ends of the passages opposite the one ends thereof according to the position of the valve element whereby the materials are fed alternately into the nozzle.

Referring now more particularly to the drawing, the apparatus of the invention includes a header 11, a valve assembly 12, and a filling structure 13. The device shown in the drawing is for the manufacture of ice cream having a checkerboard pattren of two flavors when sliced in a plane parallel to either of its six sides. It will be understood, however, that materials other than ice cream, such as sherbet, ice milk, etc., could be utilized in connection with the invention. Furthermore, sequential patterns other than the checkerboard pattern could be formed by apparatus constructed in accordance with the teaching of this specification, including patterns of three or more colors and/or flavors.

The header is comprised of a housing 15 having a center dividing wall 17 forming an upper chamber 19 and a lower chamber 21. A feeding conduit 23 is in fluid communication with chamber 19, and a particular type of ice cream, for example vanilla, is fed through conduit 23 into chamber 19 under pressure. Similarly a conduit 25 provides access into chamber 21 through which ice cream other than the type of ice cream fed into chamber 19, for example chocolate, may be fed into chamber 21 under pressure. The lower plate of housing 15 has a plurality of orifices 27 and 29 in the plate thereof. Orifices 27 and 29 are arranged in mutually perpendicular rows extending in the plane of the lower plate of housing 15 through which they are formed. It may also be observed, particularly from FIGURE 2, that the openings are arranged alternately in each of the rows to comprise a checkerboard pattern. A plurality of tubes 31, one end of each of which form orifices 29, extend through aligned openings in wall 17 to the chamber 19. The result of the arrangement is that ice cream in chamber 19 will be extruded through tubes 31 and orifices 29, whereas ice cream in chamber 21 will be extruded through the orifices 27 formed in the lower plate of housing 15.

The filling structure 13 extends down into the package illustrated by the phantom lines 33 for filling the package with a block of ice cream having the desired characteristics. Filling structure 13 includes four downwardly extending side walls 35, 36, 37 and 38 and a plurality of shorter walls 39 extending parallel with walls 35 and 37. A plurality of walls 41 extend between walls 35 and 37 perpendicularly thereof and perpendicularly intersect walls 39 to form a grid pattern and define a plurality of forming nozzles for shaping the materials into a plurality of abutting columns.

The valve assembly 12 is positioned intermediate the header 11 and the filling structure 13 for controlling the flow of the materials from the header to the forming nozzles. Valve assembly 12 is supported on the support plate 43 and includes a housing 45 upon which the housing 15 of header 11 is supported. The filling structure 13 communicates with the valve assembly 12 through a suitable opening in the plate 43.

Valve assembly 12 comprises a movable valve element 47 confined inside of housing 45 and movable between first and second positions in a plane transverse to the flow of materials from header 11 to filling structure 13. A plurality of tapered passages 49 are formed in valve element 47. Each of passages 49 is of sufficient size at its top to remain in fluid communication with an associated one of openings 27 and 29 in both of the two positions of member 47. Thus, through a given one of passages 49 there will always be a flow of the same type of ice cream.

Each of passages 49 is shaped such that it changes from an oval cross section at its top to a square cross section at its bottom, about midway in the passage as indicated at 51. Each passage is positioned such that at the lower or square end, that is, that end which is adjacent the filling structure 13, the passage will be in fluid communication and aligned with first one nozzle and then another adjacent nozzle depending upon the position of the valve element 47. Those passages 49 at each end of valve element 47 (see FIGURE 3) will be blocked by the plate 43 in one of the two positions of valve element 47. Valve element 47 is reciprocated by a solenoid 53 through a drive rod 51 extending through a suitable aperture in one end of the housing 45.

In forming the ice cream product, the ice cream is cooled to a point where it is fluid and capable of being extruded but is not sufficiently fluid to readily mix or diffuse into adjacent ice cream of a different color and/or flavor. Referring to FIGURE 1, assume chamber 19 is filled with chocolate ice cream under pressure and that chamber 21 is filled with vanilla ice cream under pressure. When valve element 47 is in the position shown, the nozzles will pass, from left to right, chocolate, vanilla, chocolate, and vanilla. With valve element 47 moved to its other position, with the left hand edge thereof abutting the inside of the left hand wall of housing 41 in FIGURE 1, the nozzles will pass, from left to right, vanilla, chocolate, vanilla, and chocolate. Because of the arrangement of openings 27 and 29 shown in FIGURE 2, not only will the columns of ice cream formed by the nozzles be in alternate sections of chocolate and vanilla, but the adjacent sections in the respective columns will form a checker board pattern in planes parallel to the plane of plate 43. Thus, if the final block of ice cream is sliced in a plane parallel to any of its six sides, a checkerboard pattern will result. Such a product is formed without any relative movement between the header 11 and the filling structure 13. The moving parts are few and operate in a simple manner such that complexity of construction is avoided.

In order to form a product having three or more colors in sequential pattern, additional chambers can be provided in header 11 connected to appropriate ones of the orifices. By so modifying the apparatus shown in the drawings, there could be provided as many flavors or colors as there are orifices in the header. The existing equipment, however, would not provide a perfect sequential arrangement of colors in each of the three directions parallel to the respective edges of the main block formed.

To achieve the latter type of arrangement, it is necessary to make further modifications in the apparatus. There should be provided one more row of orifices in the header transverse to the movement of the valve element 47 for each additional flavor and/or color desired. A corresponding additional row of passages 49 in valve element 47 should also be provided. Valve element 47 is constructed to be movable to three or more positions corresponding to the number of flavors or colors. Each of passages 49 should be wide enough at the top to communicate with the same header orifice in all positions of valve element 47. In such a construction, for each position of the valve element 47, each nozzle would be in communication with a different flavor or color of ice cream in the desired sequential order. Various arrangements might be proposed such that the movement of the valve element 47 is not in a single direction but moves in a circular or triangular path to various positions in a plane transverse to the flow of ice cream from header 11 to filling structure 13. Such other embodiments and modifications of this invention will be apparent to those skilled in the art from the foregoing description, and such are intended to fall within the scope of the appended claims.

What is claimed is:

1. Apparatus for forming an edible product into a column comprised of a plurality of plastic materials in sequentially arranged sections, said apparatus including in combination, a header having a plurality of orifices therein, means for extruding each of the materials through a respective one of said orifices in said header, a forming nozzle for shaping the materials into a column, and a valve positioned intermediate said header and said forming nozzle for controlling the flow of the materials from said header to said forming nozzle, said valve comprising a valve element movable relative to said header and nozzle to a plurality of different positions in a plane transverse to the flow of materials from said header to said nozzle, the number of said positions equaling the number of said different materials, said valve element having a plurality of passages therein communicating individually at one of its ends with one of said orifices and each remaining in communication with the same orifice in all of said positions of said valve element, the other ends of said passages sequentially communicating with said nozzle one at a time according to the positions to which said valve element is movable for feeding the materials sequentially into said nozzle.

2. Apparatus for forming an edible product into a column comprised of two plastic materials in alternating sections, said apparatus including in combination, a header having two orifices therein, means for extruding each of the materials through a respective one of said orifices in said header, a forming nozzle for shaping the materials into a column, and a valve positioned intermediate said header and said forming nozzle for controlling the flow of the materials from said header to said forming nozzle, said valve comprising a valve element linearly movable relative to said header and nozzle between first and second positions transversely with respect to the flow of materials from said header to said nozzle, said valve element having first and second passages therein each communicating at one of its ends with one of said orifices and each remaining in communication with the same orifice in both said first and second positions of said valve element, the other ends of said first and second passages alternately communicating with said nozzle in said first and second position thereof, respectively, for feeding the materials alternately into said nozzle.

3. Apparatus for forming an edible product into a rectangular main block comprised of a plurality of substantially smaller adjacent rectangular blocks of a substantially lesser plurality of different plastic materials arranged sequentially in each of the three directions parallel to the respective edges of the main block, said apparatus including in combination, a header having a plurality of adjacent orifices therein arranged in rows extending in each of two mutually perpendicular directions, means for extruding each of the materials through a respective one of said orifices such that the different materials are arranged sequentially in each of the two mutually perpendicular directions, a plurality of adjacent forming nozzles, and a valve positioned intermediate said header and said forming nozzles for controlling the flow of the materials from said header to said forming nozzles, said valve comprising a valve element linearly movable relative to said header and nozzles between a plurality of positions transversely with respect to the flow of the materials from said header to said forming nozzles, said valve element having a plurality of passages therein each in communication at one end thereof individually with one of said orifices in all of the positions of said valve element, each of said passages sequentially communicating with different ones of said nozzles at the end of said passage opposite said one end thereof in accordance with the position of said member for feeding the materials sequentially into each respective one of said nozzles.

4. Apparatus for forming an edible product into a rectangular main block comprised of a plurality of substantially smaller adjacent rectangular blocks of two different plastic materials arranged alternately in each of the three directions parallel to the respective edges of the main block, said apparatus including in combination, a header having a plurality of coplanar orifices therein arranged in mutually parallel first rows extending in a given direction and in mutually parallel second rows extending in a direction normal to the given direction, means for extruding each of the materials through respective ones of said orifices such that the different materials are arranged alternately in each of said first and second parallel rows of said orifices, a plurality of adjacent forming nozzles each of rectangular cross section, said nozzles being arranged in mutually parallel first rows extending in the given direction and in mutually parallel second rows extending in a direction normal to the given direction, said plurality of nozzles being arranged with one less second row than the number of said second rows of said orifices, and a valve positioned intermediate said header and said forming nozzles for controlling the flow of the materials from said header to said forming nozzles, said valve comprising a valve element linearly movable relative to said header and nozzles between first and second positions in said given direction and having a plurality of passages therein each communicating at one end thereof individually with one of said orifices in both said first and second positions of said valve element, each of said passages alternately communicating with different ones of said nozzles at the end of said passage opposite said one end thereof according to the position of said valve element, whereby the materials are fed alternately into each respective one of said nozzles.

References Cited

UNITED STATES PATENTS

| | | | |
|---|---|---|---|
| 3,372,654 | 3/1968 | Bell | 107—1 |
| 3,377,964 | 4/1968 | Bell et al. | 107—1.4 |
| 797,276 | 8/1905 | Glauser | 107—1 |
| 1,378,572 | 5/1921 | Stevens | 222—137 |
| 1,951,694 | 3/1934 | Goulstone | 107—54 X |
| 2,042,940 | 6/1936 | Herron | 107—1 |
| 3,213,808 | 10/1965 | Schafer | 107—1 |
| 3,295,466 | 1/1967 | Bell et al. | 107—1 |
| 3,295,467 | 1/1967 | Gropen | 107—1 |

WALTER A. SCHEEL, *Primary Examiner.*

A. O. HENDERSON, *Assistant Examiner.*

U.S. Cl. X.R.

141—105; 222—135